United States Patent
Thoreson et al.

(10) Patent No.: US 11,260,714 B2
(45) Date of Patent: Mar. 1, 2022

(54) COMPACT CONTROL ARM AND SUSPENSION CYLINDER PIVOT

(71) Applicant: DEERE & COMPANY, Moline, IL (US)

(72) Inventors: Curtis P. Thoreson, Janesville, IA (US); Dennis A. Bowman, Denver, IA (US)

(73) Assignee: DEERE & COMPANY, Moline, IL (US)

( * ) Notice: Subject to any disclaimer, the term of this patent is extended or adjusted under 35 U.S.C. 154(b) by 19 days.

(21) Appl. No.: 16/806,292

(22) Filed: Mar. 2, 2020

(65) Prior Publication Data
US 2021/0268854 A1 Sep. 2, 2021

(51) Int. Cl.
*B60G 7/02* (2006.01)
*B60G 3/18* (2006.01)
*B60G 7/00* (2006.01)

(52) U.S. Cl.
CPC ............... *B60G 7/02* (2013.01); *B60G 3/185* (2013.01); *B60G 7/001* (2013.01); *B60G 2200/18* (2013.01)

(58) Field of Classification Search
CPC .......... B60G 7/02; B60G 3/185; B60G 7/001; B60G 2200/18
See application file for complete search history.

(56) References Cited

U.S. PATENT DOCUMENTS

| | | | | | |
|---|---|---|---|---|---|
| 2,260,634 | A | * | 10/1941 | Mullner | B60G 3/20 267/34 |
| 2,339,533 | A | * | 1/1944 | Wahiberg | B60G 7/02 267/254 |
| 2,344,896 | A | * | 3/1944 | Phelps | B60G 7/04 267/222 |
| 2,635,927 | A | * | 4/1953 | Leighton | B60G 7/02 403/36 |
| 4,546,997 | A | * | 10/1985 | Smyers | B62D 9/02 180/210 |
| 4,813,704 | A | * | 3/1989 | Smith | B60G 3/265 280/124.109 |
| 5,536,035 | A | * | 7/1996 | Bautz | B60G 3/20 280/124.139 |
| 6,267,387 | B1 | * | 7/2001 | Weiss | B60G 3/26 280/124.106 |
| 6,874,816 | B2 | * | 4/2005 | Herrmann | B60G 3/20 280/781 |
| 8,205,900 | B1 | * | 6/2012 | Moravy | B60G 3/265 280/124.138 |

(Continued)

*Primary Examiner* — Darlene P Condra
(74) *Attorney, Agent, or Firm* — Michael Best & Friedrich LLP

(57) ABSTRACT

A work vehicle includes a chassis, a prime mover configured to move the chassis along a ground surface, and a suspension assembly that couples a wheel to the chassis. The suspension assembly includes a knuckle coupled to the wheel, a first suspension arm, and a suspension cylinder. The first suspension arm includes a first portion rotatably coupled to the chassis and a second portion extending away from the first portion and coupled to the knuckle. The suspension cylinder is rotatably coupled to the chassis and to a second suspension arm. The first suspension arm and the suspension cylinder are each configured to pivot relative to the chassis about a common pivot axis.

18 Claims, 6 Drawing Sheets

(56) References Cited

U.S. PATENT DOCUMENTS

| | | | | |
|---|---|---|---|---|
| 8,919,794 B2* | 12/2014 | Kunert | ................ | B60G 3/20 |
| | | | | 280/124.152 |
| 2003/0209872 A1* | 11/2003 | Baxter | ................ | B60G 5/00 |
| | | | | 280/124.128 |
| 2005/0146111 A1* | 7/2005 | Yamazaki | ............. | B62D 7/18 |
| | | | | 280/124.135 |
| 2007/0194550 A1* | 8/2007 | Wadelton | ............ | B62K 25/26 |
| | | | | 280/124.116 |
| 2009/0160153 A1* | 6/2009 | Kunert | ................ | B60G 3/20 |
| | | | | 280/124.138 |
| 2019/0381845 A1* | 12/2019 | Matsumoto | ......... | B60G 3/225 |
| 2020/0164709 A1* | 5/2020 | Carlitz | .............. | B60G 3/185 |

* cited by examiner

COMPACT CONTROL ARM AND SUSPENSION CYLINDER PIVOT

BACKGROUND

The present disclosure relates to work vehicles having an independent link suspension, and more particularly to mount configurations for suspension components.

SUMMARY

In one embodiment, the disclosure provides a work vehicle that includes chassis, a prime mover configured to move the chassis along a ground surface, and a suspension assembly that couples a wheel to the chassis. The suspension assembly includes a knuckle coupled to the wheel, a first suspension arm, and a suspension cylinder. The first suspension arm includes a first portion rotatably coupled to the chassis and a second portion extending away from the first portion and coupled to the knuckle. The suspension cylinder is rotatably coupled to the chassis and to a second suspension arm. The first suspension arm and the suspension cylinder are each configured to pivot relative to the chassis about a common pivot axis.

In another embodiment, the disclosure provides a work vehicle that includes a chassis, a prime mover configured to move the chassis along a ground surface, and a suspension assembly that couples a wheel to the chassis. The chassis includes a pair of opposed flanges spaced apart from one another along a direction of a longitudinal axis of the chassis and configured to support a pin therebetween. The suspension assembly includes a knuckle coupled to the wheel, a first suspension arm, and a suspension cylinder. The first suspension arm includes a first portion rotatably coupled to the chassis and a second portion extending away from the first portion and coupled to the knuckle. The first portion comprises a first leg and a second leg spaced apart from the first leg along the direction of the longitudinal axis. The suspension cylinder is rotatably coupled to the chassis and to a second suspension arm. The second leg and the suspension cylinder are each rotatably coupled to the chassis via the pin.

In another embodiment, the disclosure provides a suspension subassembly including a suspension arm, a suspension cylinder, and a pin. The pin is configured to be received by each of the suspension arm and the suspension cylinder such that during operation of the suspension subassembly, the suspension arm and the suspension cylinder each rotate about a central axis of the pin.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways.

Figure 1:
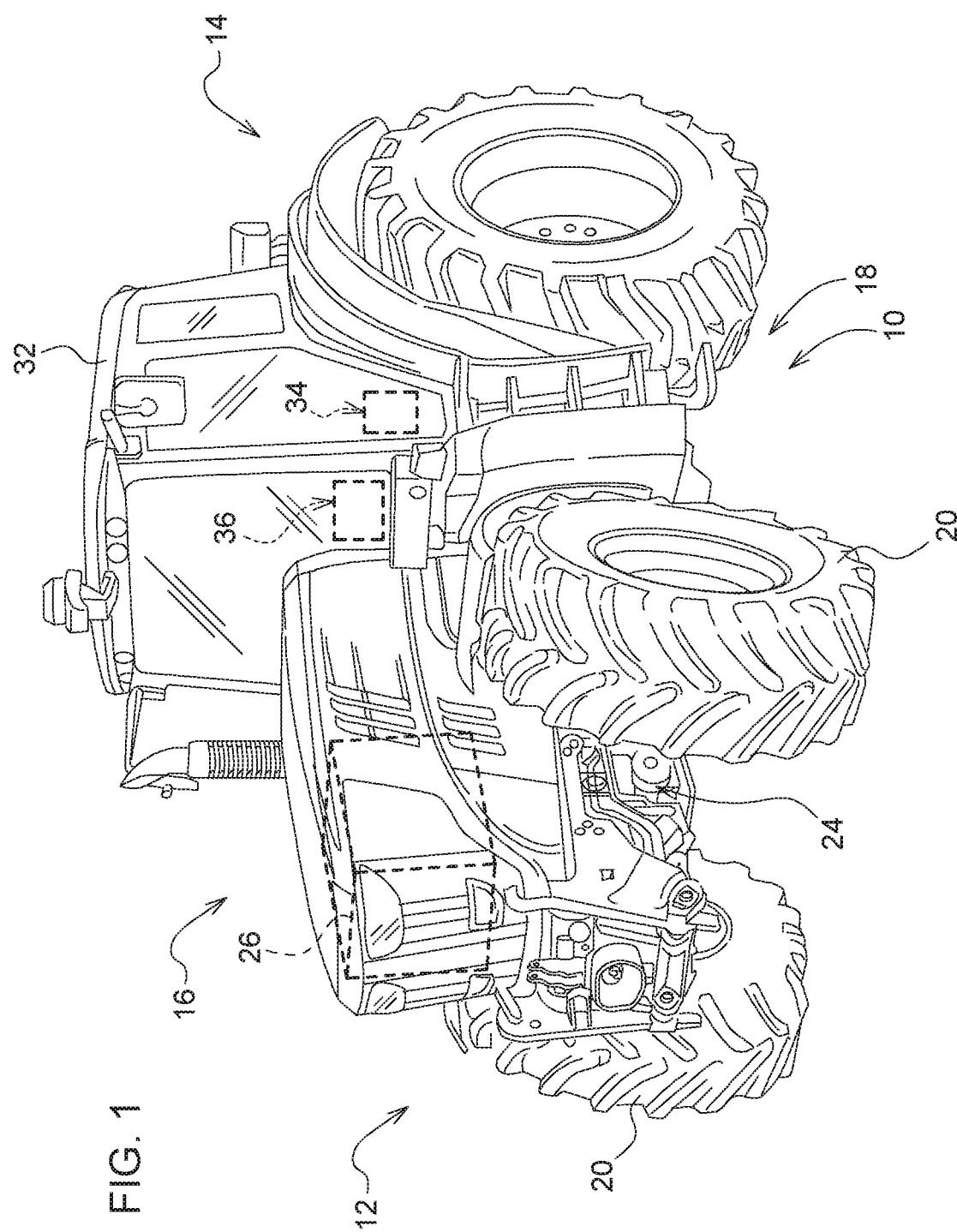
FIG. 1 is a perspective view of a work vehicle.

FIG. 1 illustrates a work vehicle 10 including a front portion 12, a rear portion 14, a first side portion 16, a second side portion 18, front wheels 20, a chassis 24, a prime mover 26, a cab 32, a controller 34, and a user interface 36. The front wheels 20 are connected to the chassis 24 proximate the front portion 12. While front wheels 20 are illustrated, other ground-engaging implements, such as tracks, can be utilized.

The prime mover 26 is coupled to the chassis 24 proximate the front portion 12 and configured to provide power to the front wheels 20 to thereby move the work vehicle 10 over a ground surface.

The cab 32 is connected to the chassis 24 proximate the rear portion 14. The controller 34 can be positioned in or near the cab 32 and is electrical communication with the front wheels 20 and the prime mover 26 to send and receive signals from the front wheels 20 and the prime mover 26.

The user interface 36 is located in the cab 32 such that an operator positioned in the cab 32 can engage the user interface 36, which is in electrical communication with the controller 34 to send and receive signals.

Figure 2:
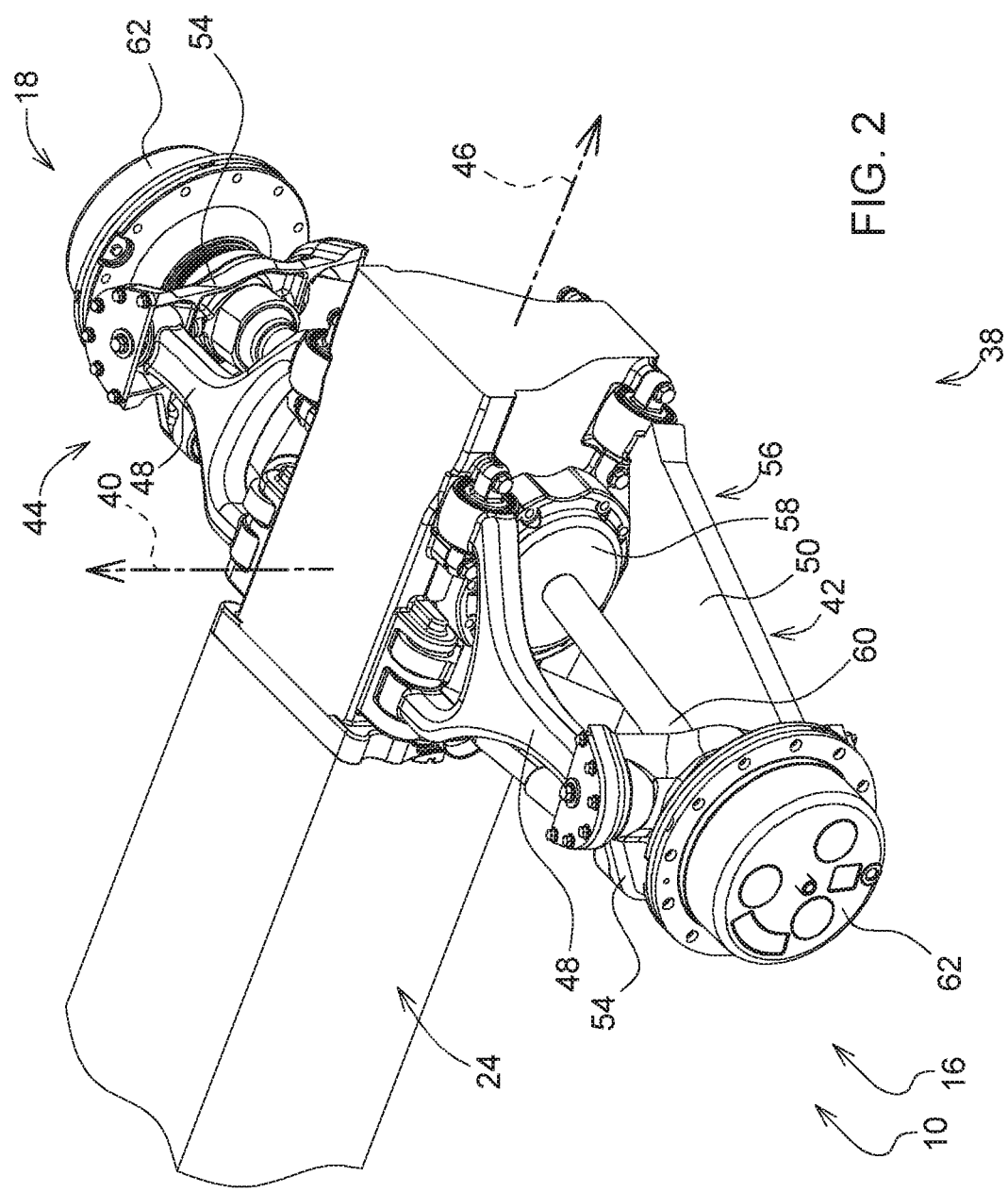
FIG. 2 is a first side perspective view of a portion of the work vehicle of FIG. 1.
Figure 3:
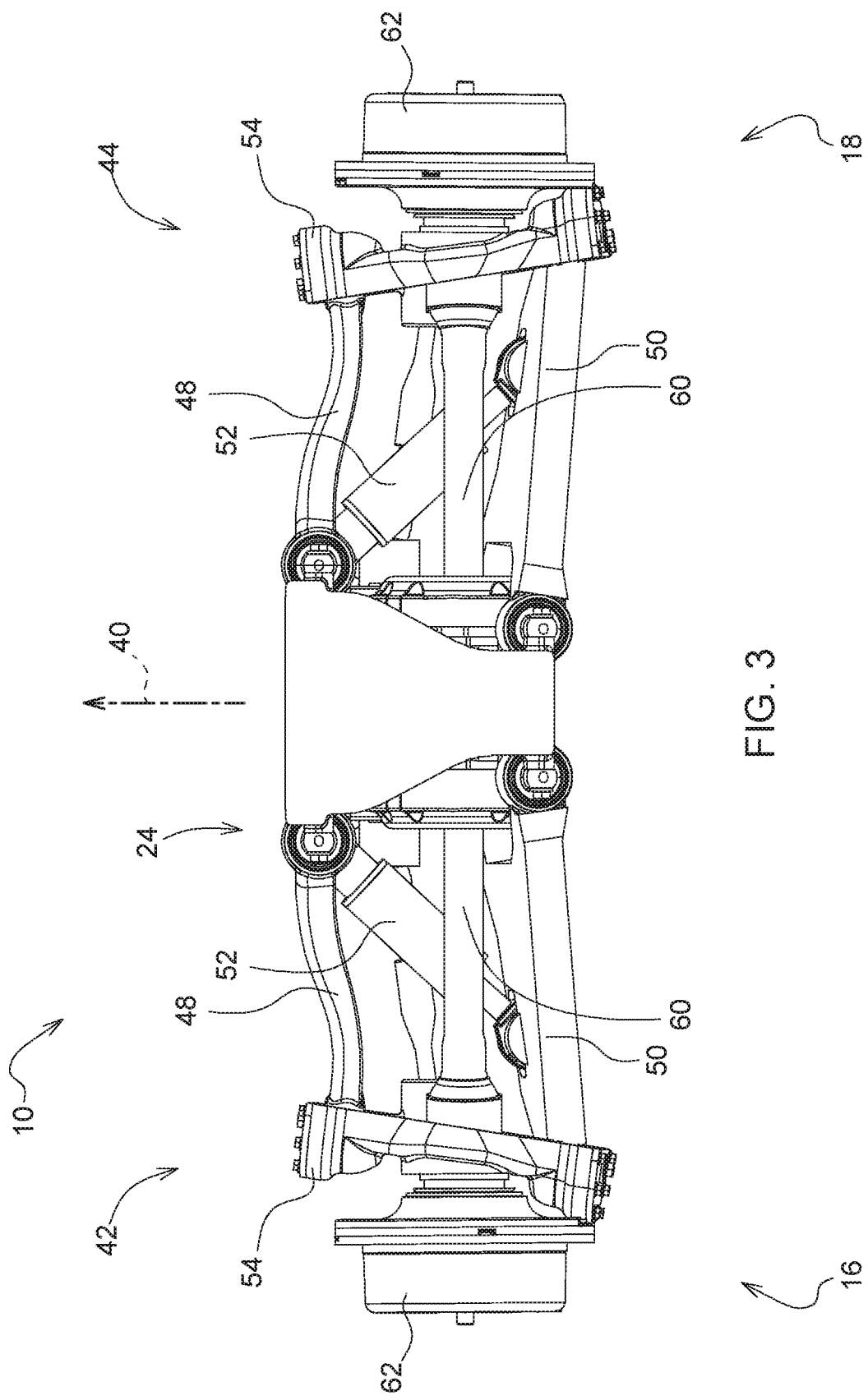
FIG. 3 is a front view of the portion of the work vehicle shown in of FIG. 2.

With reference to FIGS. 2 and 3, the work vehicle 10 includes a drivetrain 56 that delivers torque from the prime mover 26 to the front wheels 20. The drivetrain 56 includes a gearbox 58 coupled to the prime mover 26, an axle shaft 60 that extends from the gearbox 58 at each of the first and second side portions 16, 18, and a wheel hub 62 coupled to each axle shaft 60.

The work vehicle 10 also includes a suspension assembly 38 that connects the front wheels 20 (FIG. 1) to the chassis 24. The suspension assembly 38 permits vertical movement of the chassis 24 relative to the front wheels 20 along a vertical axis 40 extending generally orthogonal to the ground surface (not shown). The illustrated suspension assembly 38 is an independent link suspension assembly 38 that includes a first side subassembly 42 and a second side subassembly 44. The first and second side subassemblies 42, 44 are substantially mirror-images of one another about a longitudinal axis 46 of the work vehicle 10.

With continued reference to FIGS. 2 and 3, the first and second side subassemblies 42, 44 of the suspension assembly 38 each include a first suspension arm or upper control arm 48, a second suspension arm or lower control arm 50, a suspension cylinder 52 (FIG. 3), and a steering knuckle 54.

Each steering knuckle 54 rotatably supports a respective wheel hub 62, and each wheel hub 62 is coupled to each respective axle shaft 60 for co-rotation therewith. Each front wheel 20 attaches to a respective wheel hub 62 at each of the first and second side portions 16, 18. In this manner, the suspension assembly 38 is connected to each front wheel 20—via each wheel hub 62 supported by each respective steering knuckle 54.

Figure 4:
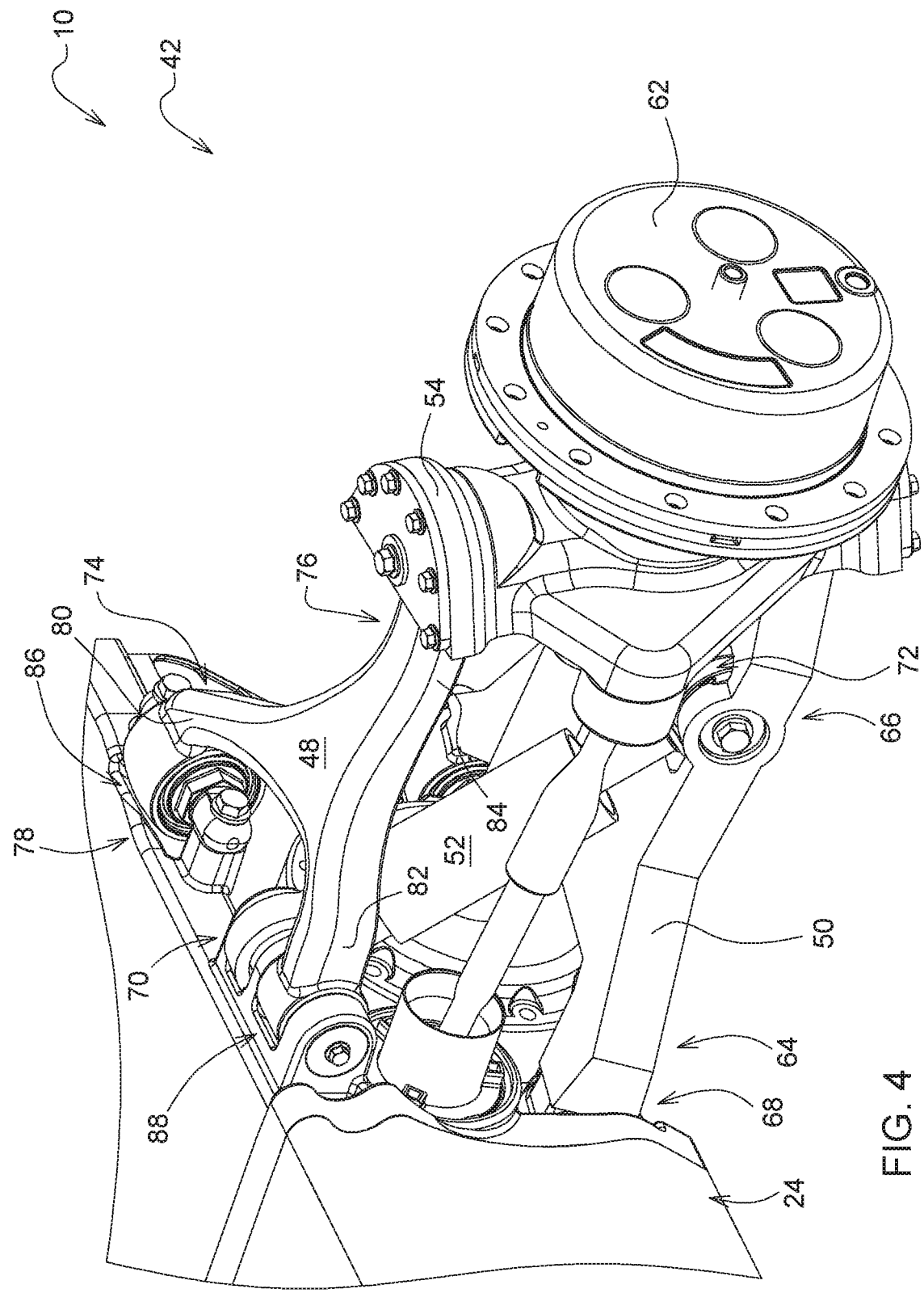
FIG. 4 is a close up rear perspective view of the portion of the work vehicle shown in FIG. 2.

With reference to FIG. 4, each lower control arm 50 includes a lower arm first portion 64 coupled to the chassis 24 and a lower arm second portion 66 opposite the lower arm first portion 64 and pivotably coupled to the steering knuckle 54 (e.g., via a ball joint assembly). The lower arm first portion 64 is rotatably coupled to the chassis 24 (e.g., via a pinned connection) at a lower arm mount 68, so that the lower arm second portion 66 can swing about the lower arm mount 68 during operation of the work vehicle 10.

Each suspension cylinder 52 is an elongated member that extends between a first or cylinder portion 70 coupled to the chassis 24, and a second or rod portion 72 coupled to the lower control arm 50. The suspension cylinder 52 is configured to extend or retract in length between the cylinder portion 70 and the rod portion 72 (e.g., via hydraulic actuation).

Again referring to FIG. 4, each upper control arm 48 similarly includes an upper arm first portion 74 coupled to the chassis 24, and an upper arm second portion 76 opposite the upper arm first portion 74 and pivotably coupled to the steering knuckle 54 (e.g., via a ball joint assembly). The upper arm first portion 74 is likewise rotatably coupled to the chassis 24 (e.g., via a pinned connection) at an upper arm mount 78, so that the upper arm second portion 76 can swing about the upper arm mount 78 during operation of the work vehicle 10.

Figure 5:
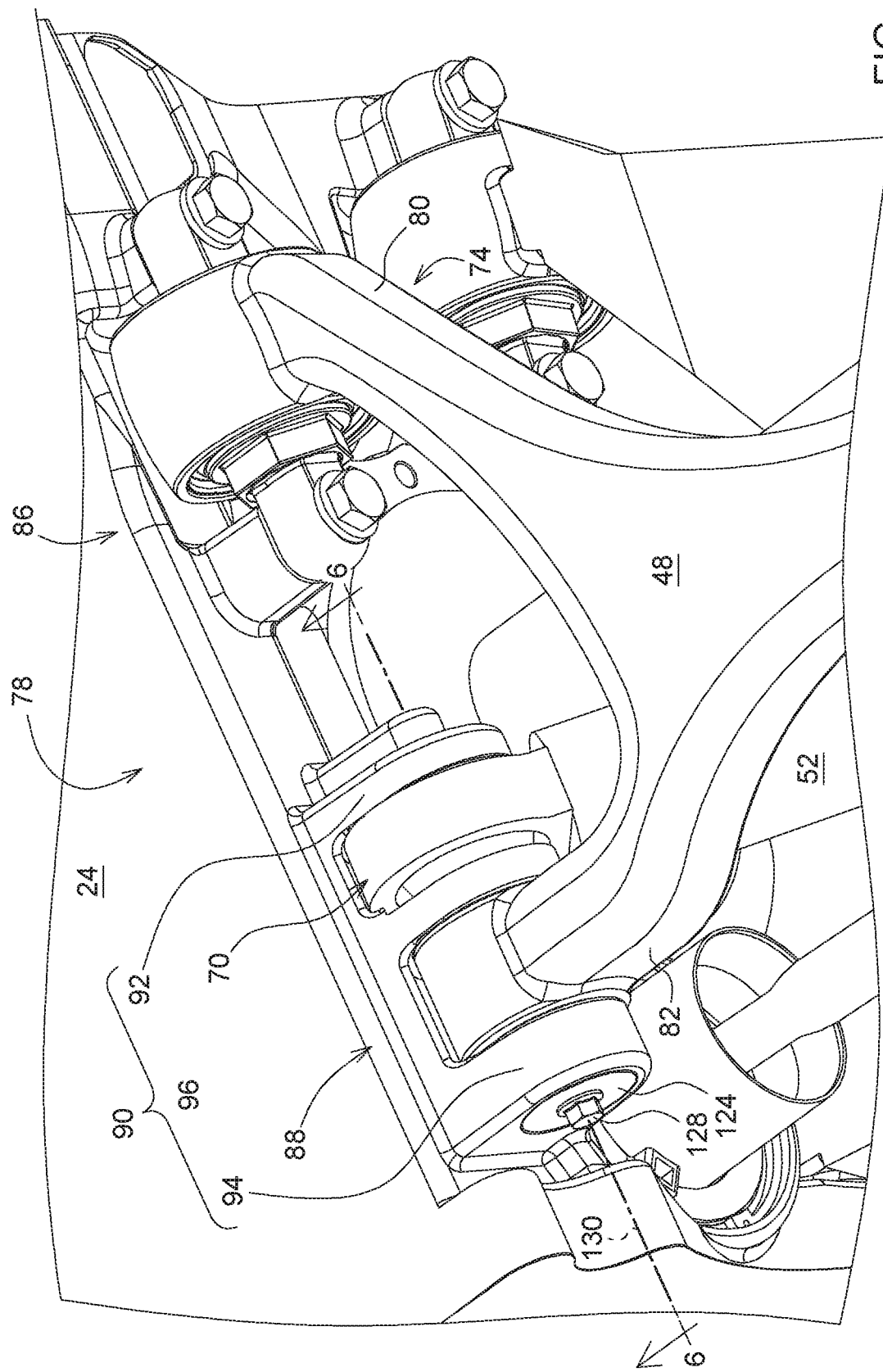
FIG. 5 is a close up top perspective view of the portion of the work vehicle shown in FIG. 2.

With reference to FIGS. 4 and 5, the upper arm first portion 74 comprises a first leg 80, a second leg 82, and a part of a third leg 84 extending generally away from the first and second legs 80, 82. The third leg 84 terminates at the upper arm second portion 76. The first and second legs 80, 82 are spaced apart from one another along a direction of the longitudinal axis 46 (FIG. 2).

The upper arm mount 78 includes a front mounting structure 86 extending from the chassis 24, and a rear mounting structure 88 extending from the chassis 24 and spaced apart from the front mounting structure 86 along a direction of the longitudinal axis 46 (FIG. 2). The front mounting structure 86 couples the first leg 80 to the chassis 24, and the rear mounting structure 88 couples the second leg 82 to the chassis 24.

Figure 6:
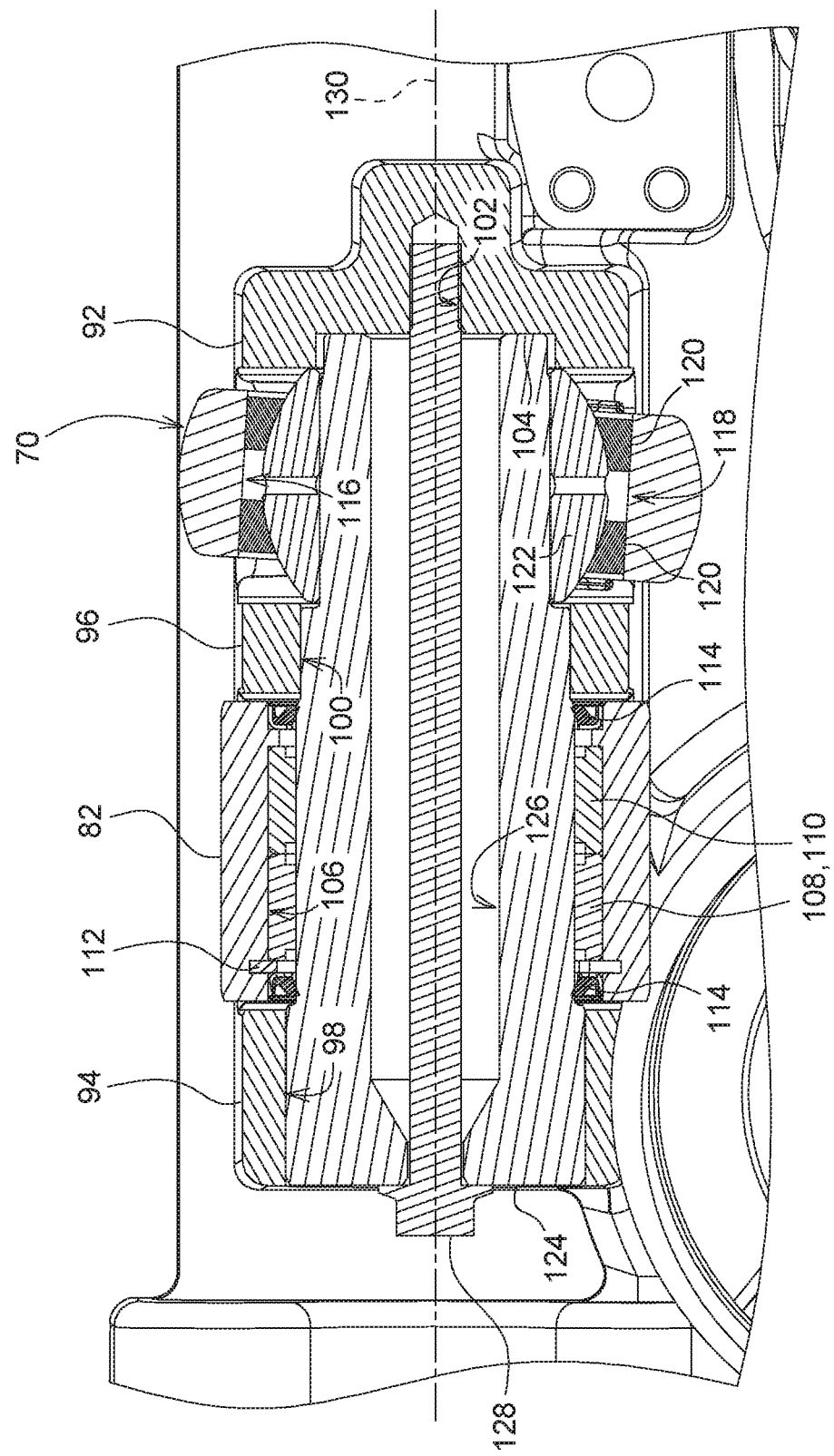
FIG. 6 is a close up cross-sectional perspective view of the portion of the work vehicle shown in FIG. 2, taken along line 6-6 of FIG. 5.

With reference to FIGS. 5 and 6, the rear mounting structure 88 includes a double clevis 90 having a first or front flange 92, a second or rear flange 94, and a third or intermediate flange 96 located between the front and rear flanges 92, 94. The annular rear flange 94 defines a first aperture 98, and the annular intermediate flange 96 defines a second aperture 100. The annular front flange 92 defines a threaded bore 102, and a counterbore 104 adjacent the threaded bore 102.

The second leg 82 of the upper control arm 48 is received into a space defined between the rear flange 94 and the intermediate flange 96. The second leg 82 defines a first bearing mount 106 that receives a first bearing 108. In the illustrated embodiment, the first bearing 108 is formed as a pair of first bearing races 110 retained within the first bearing mount 106 by a circlip 112. The second leg 82 further includes a pair of seals 114 that retain a lubricant within the first bearing mount 106.

In addition to coupling the second leg 82 to the chassis 24, the rear mounting structure 88 also couples the suspension cylinder 52 to the chassis 24. Specifically, the cylinder portion 70 of the suspension cylinder 52 is received into a space defined between the intermediate flange 96 and the front flange 92. The cylinder portion 70 defines a second bearing mount 116 that receives a second bearing 118. In the illustrated embodiment, the second bearing 118 is formed as a spherical bearing 118 having a pair of cup races 120, and a cup 122 received between the cup races 120.

With reference to FIG. 6, the rear mounting structure 88 further includes a pin 124 that couples each of the second leg 82 and the suspension cylinder 52 to the double clevis 90. Specifically, the pin 124 extends through the first aperture 98, the first bearing 108, the second aperture 100, and the second bearing 118, and further extends into the counterbore 104. The pin 124 includes a central bore 126, and the rear mounting structure 88 further includes a bolt 128 that extends through the central bore 126 and threads into the threaded bore 102 to secure the pin 124 in place. It is contemplated that in other embodiments the bolt 128 may alternatively thread into a separate nut (not shown) in place of the threaded bore 102.

The pin 124 defines a common pivot axis 130 about which each of the upper control arm 48 and the suspension cylinder 52 rotate with respect to the chassis 24. In this regard, each of the first aperture 98, the second aperture 100, the threaded bore 102, and the counterbore 104 is centered about the common pivot axis 130.

In operation, when the suspension cylinder 52 is actuated to extend in length, the suspension cylinder 52 exerts a force on the lower control arm 50. The exerted force causes the lower arm second portion 66 to swing about the lower arm mount 68 so that the chassis 24 substantially rises along the vertical axis 40 (FIG. 2) relative to the front wheels 20 and to the ground surface. Similarly, when the suspension cylinder 52 is actuated to retract in length, a weight of the chassis 24 causes the lower arm second portion 66 to swing about the lower arm mount 68 so that the chassis 24 substantially lowers along the vertical axis 40 relative to the front wheels 20 and to the ground surface. As the chassis 24 moves upward or downward relative to the front wheels 20 generally along the vertical axis 40 (FIG. 2), both the upper control arm 48 and the suspension cylinder 52 rotate about the common pivot axis 130 relative to the chassis 24.

By providing the common rear mounting structure 88 for both the second leg 82 and the suspension cylinder 52, such that the second leg 82 and the suspension cylinder 52 are supported by a common pin 124 defining a common pivot axis 130, space saving advantages are realized. Specifically, a relatively smaller region of the chassis 24 is devoted to the common rear mounting structure 88 as compared to traditional suspension assemblies having separate mounting structures for the upper control arm and the suspension cylinder. By utilizing less space adjacent the chassis 24 to support the upper control arm 48 and the suspension cylinder 52, more space can subsequently be devoted to other purposes, e.g., for permitting a wider turn radius for the wheels 20, sizing cooling components to improve cooling capacity of the work vehicle 10, or adding further features to the work vehicle. Additionally or alternatively, an overall vehicle envelope of the work vehicle 10 can be reduced as a result of the relative compactness of the common rear mounting structure 88.

A further advantage of the common rear mounting structure 88 is that the first and second legs 80, 82 of the upper control arm 48 can be spaced relatively farther apart from one another as compared to the arm portions of the upper control arms of traditional suspension assemblies, that employ separate mounting locations for the upper control arm and the suspension cylinder. By spacing the first and second legs 80, 82 relatively farther apart from one another, the weight of the chassis is more efficiently distributed, and reactionary forces due to impacts of the front wheels 20 with the ground surface are better tolerated.

Although the disclosure has been described in detail with reference to certain preferred embodiments, variations and modifications exist within the scope and spirit of one or more independent aspects of the disclosure as described.

What is claimed is:

1. A work vehicle comprising:
a chassis;
a prime mover configured to move the chassis along a ground surface; and
a suspension assembly that couples a wheel to the chassis, the suspension assembly including
a knuckle coupled to the wheel,
a first suspension arm having a first portion rotatably coupled to the chassis and
a second portion extending away from the first portion and coupled to the knuckle, and
a suspension cylinder rotatably coupled to the chassis and to a second suspension arm,
wherein the first suspension arm and the suspension cylinder are each configured to pivot relative to the chassis about a common pivot axis; and
wherein the suspension cylinder is configured to be actuated to selectively extend and retract in length between the chassis and the second suspension arm, to thereby selectively raise and lower a height of the chassis relative to the ground surface.

2. The work vehicle of claim 1, wherein the second suspension arm is rotatably coupled to the chassis and further coupled to the knuckle.

3. The work vehicle of claim 1, wherein the suspension assembly further includes a pin configured to be received by each of the first suspension arm and the suspension cylinder.

4. The work vehicle of claim 1, wherein the chassis extends along a longitudinal axis, and wherein the first portion of the first suspension arm comprises a first leg and a second leg spaced apart from the first leg along a direction of the longitudinal axis.

5. The work vehicle of claim 4, wherein the chassis includes a first flange, a second flange spaced apart from the first flange along the direction of the longitudinal axis, and a third flange located between the first and second flanges, and wherein the second leg is received between the second flange and the third flange, and wherein a cylinder portion of the suspension cylinder is received between the first flange and the third flange.

6. The work vehicle of claim 5, wherein a pin couples each of the first leg and the cylinder portion to the first, second, and third flanges, and wherein the pin defines the common pivot axis.

7. The work vehicle of claim 1, wherein the first portion of the first suspension arm includes a first leg and a second leg spaced apart from the first leg along a direction of a longitudinal axis of the chassis, and wherein the first leg and the suspension cylinder are each rotatably coupled to the chassis via a pin that defines the common pivot axis.

8. The work vehicle of claim 7, wherein the first leg defines a first bearing mount that receives a first bearing, and wherein the suspension cylinder includes a cylinder portion that defines a second bearing mount that receives a second bearing.

9. The work vehicle of claim 8, wherein the first and second bearings each receive the pin therethrough.

10. A work vehicle comprising:
a chassis including a pair of opposed flanges spaced apart from one another along a direction of a longitudinal axis of the chassis and configured to support a pin therebetween;
a prime mover configured to move the chassis along a ground surface; and
a suspension assembly that couples a wheel to the chassis, the suspension assembly including
a knuckle coupled to the wheel,
a first suspension arm having a first portion rotatably coupled to the chassis and a second portion extending away from the first portion and coupled to the knuckle, the first portion comprising a first leg and a second leg spaced apart from the first leg along the direction of the longitudinal axis, and
a suspension cylinder rotatably coupled to the chassis and to a second suspension arm;
wherein the second leg and the suspension cylinder are each rotatably coupled to the chassis via the pin; and
wherein the pair of opposed flanges include a first flange and a second flange, and wherein the chassis further includes a third flange located between the first flange and the third flange, and wherein the second leg is received between the second flange and the third flange, and wherein a cylinder portion of the suspension cylinder is received between the first flange and the third flange.

11. The work vehicle of claim 10, wherein the second suspension arm is rotatably coupled to the chassis and further coupled to the knuckle.

12. The work vehicle of claim 10, wherein the first leg defines a first bearing mount that receives a first bearing, and wherein the cylinder portion defines a second bearing mount that receives a second bearing.

13. The work vehicle of claim 12, wherein the first and second bearings each receive the pin therethrough.

14. The work vehicle of claim 10, wherein the pin defines a common pivot axis, and wherein the suspension cylinder and the first suspension arm are each configured to rotate about the common pivot axis.

15. The work vehicle of claim 14, wherein the suspension cylinder includes a cylinder portion and a rod portion, and wherein the cylinder portion is rotatably coupled to the chassis via the pin, and wherein the rod portion is coupled to the second suspension arm.

16. The work vehicle of claim 10, wherein one flange of the pair of opposed flanges defines a threaded bore and a counterbore adjacent the threaded bore that receives the pin, and wherein the suspension assembly further includes a bolt that extends through the pin and threads into the threaded bore to secure the pin between the pair of opposed flanges.

17. A suspension subassembly comprising:
a first suspension arm;
a suspension cylinder including a cylinder portion and a rod portion, the rod portion being configured to rotatably connect to a second suspension arm; and
a pin configured to be received by each of the first suspension arm and the cylinder portion of the suspension cylinder such that during operation of the suspension subassembly, the first suspension arm and the suspension cylinder each rotate about a central axis of the pin.

18. A work vehicle comprising:
a chassis;
a prime mover configured to move the chassis along a ground surface; and
the suspension subassembly of claim 17 coupling a wheel to the chassis.

* * * * *